(12) United States Patent
Huang

(10) Patent No.: US 10,109,037 B1
(45) Date of Patent: Oct. 23, 2018

(54) SYSTEMS AND METHODS FOR BAYER IMAGE SCALING BASED ON EDGE DETECTION

(71) Applicant: Marvell International Ltd., Hamilton (BM)

(72) Inventor: Samson Huang, Saratoga, CA (US)

(73) Assignee: Marvell International Ltd., Hamilton (BM)

( * ) Notice: Subject to any disclaimer, the term of this patent is extended or adjusted under 35 U.S.C. 154(b) by 161 days.

(21) Appl. No.: 15/171,216

(22) Filed: Jun. 2, 2016

Related U.S. Application Data

(60) Provisional application No. 62/169,784, filed on Jun. 2, 2015.

(51) Int. Cl.
G06T 3/40 (2006.01)
H04N 9/07 (2006.01)
H04N 9/64 (2006.01)
G06T 7/00 (2017.01)

(52) U.S. Cl.
CPC ............ *G06T 3/4015* (2013.01); *G06T 3/403* (2013.01); *G06T 7/0085* (2013.01); *H04N 9/07* (2013.01); *H04N 9/64* (2013.01); *G06T 2207/10024* (2013.01); *G06T 2207/20021* (2013.01)

(58) Field of Classification Search
CPC ......... G06T 3/4015; G06T 2207/10024; G06T 2207/20021; G06T 3/40; G06T 3/403; G06T 3/4038; H04N 9/07; H04N 9/64; G06K 9/4604
See application file for complete search history.

(56) References Cited

U.S. PATENT DOCUMENTS

| 6,229,578 | B1 | 5/2001 | Acharya et al. | |
| 7,742,636 | B2 * | 6/2010 | Wong | G06T 3/4015 345/660 |
| 8,606,016 | B2 | 12/2013 | Hou et al. | |
| 2008/0024618 | A1 * | 1/2008 | Lim | H04N 3/1562 348/222.1 |
| 2014/0218567 | A1 * | 8/2014 | Han | H04N 5/2353 348/239 |

* cited by examiner

Primary Examiner — Twyler Haskins
Assistant Examiner — Akshay Trehan

(57) ABSTRACT

The present disclosure is directed to an imaging device and a method of scaling a Bayer domain image. In an example imaging device and method of processing an image represented in a Bayer domain, a block of the image is divided along a diagonal line to form two triangular portions of the block of the image. An upper green pixel for a scaled down image is determined based on either an average of green pixels in a first one of the two triangular portions or an average of an upper group of green pixels located along the diagonal line. A lower green pixel for the scaled down image is determined based on either an average of green pixels in a second one of the two triangular portions or an average of a lower group of green pixels located along the diagonal line.

7 Claims, 8 Drawing Sheets

SYSTEMS AND METHODS FOR BAYER IMAGE SCALING BASED ON EDGE DETECTION

CROSS-REFERENCE TO RELATED APPLICATIONS

This application claims priority to U.S. Provisional Patent Application No. 62/169,784, filed Jun. 2, 2015, entitled "Bayer Image Scaling," which is incorporated herein by reference in its entirety.

FIELD

The technology described herein relates generally to image signal processing in devices and more particularly to processing images based on Bayer image scaling.

BACKGROUND

Digital cameras often use an image sensor to capture colors, such as red, green and blue (RGB) colors. The image sensors utilize an array of pixel locations to capture RGB colors. Since each sensor location can only capture one color, a Bayer pattern is used to enable a single sensor to capture RGB colors.

SUMMARY

The present disclosure is directed to an imaging device and a method of scaling a Bayer domain image. In an example imaging device and method of processing an image represented in a Bayer domain, a block of the image is divided along a diagonal line to form two triangular portions of the block of the image. An upper green pixel for a scaled down image is determined based on either an average of green pixels in a first one of the two triangular portions or an average of an upper group of green pixels located along the diagonal line. A lower green pixel for the scaled down image is determined based on either an average of green pixels in a second one of the two triangular portions or an average of a lower group of green pixels located along the diagonal line. A red pixel for the scaled down image is determined based on either a median value of red pixels in the block of the image or an average of red pixels that are aligned in a direction of an edge within the block of the image. A blue pixel for the scaled down image is determined based on either a median value of blue pixels in the block of the image or an average of blue pixels that are aligned in the direction of the edge.

In another example imaging device and method of scaling down a Bayer domain image, an edge is detected within the Bayer domain image, and the Bayer domain image is processed to produce a scaled down image by applying scaling operations selected from a plurality of scaling operations based on an orientation of the detected edge.

DETAILED DESCRIPTION

Figure 1:
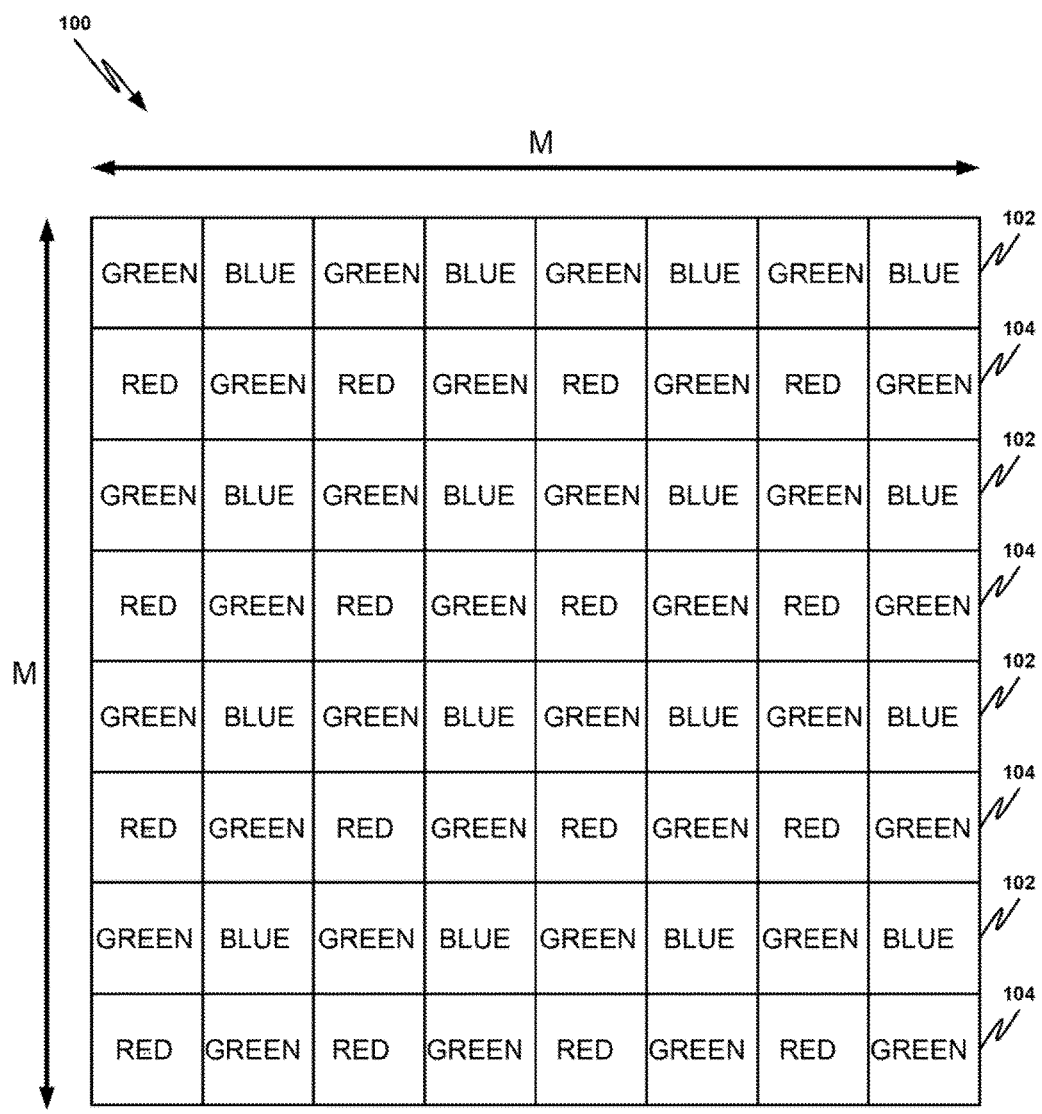
FIG. 1 depicts an array of pixels having a Bayer pattern color filter.

FIG. 1 depicts an array of pixels 100 having a Bayer pattern color filter. In an imaging device (e.g., a CMOS or CCD device), each pixel of the array 100 produces a signal that indicates an intensity of light impinging on the pixel, and a magnitude of the signal produced by each pixel is proportional to the intensity of the light impinging on the pixel. The signals produced by the pixels of the array 100 are digitized and stored in order to display a corresponding image on a monitor or to otherwise provide information about the captured image.

In order to capture a color image, the array of pixels 100 utilizes a Bayer pattern. As illustrated in FIG. 1, the Bayer pattern includes red, green, and blue pixels, where each pixel is sensitive to only one color or spectral band. Thus, photons having a wavelength corresponding to a red, green, or blue color are detected by respective red, green, or blue pixels of the array of pixels 100. To construct the Bayer pattern, a color filter array is placed in front of the pixel array 100 so that each pixel receives light of the color of its associated filter. The color filter array is arranged in the specific pattern depicted in FIG. 1.

The Bayer pattern shown in FIG. 1 includes an array of repeating red, green, and blue filters. Red pixels of the array 100 are associated with red filters of the Bayer pattern, green pixels are associated with green filters, and blue pixels are associated with blue filters. In the Bayer pattern, the red, green, and blue pixels are arranged so that alternating red and blue pixels are included in rows 102 of the pixel array 100, and alternating red and green pixels are included in rows 104 of the pixel array 100. The rows 102, 104 including such alternating pixels that are repeated throughout the pixel array 100. Although FIG. 1 depicts the pixel array 100 having M rows and M columns, where M is equal to "8," in other examples, the pixel array 100 includes any number of different rows and columns. Typically, the pixel array 100 includes hundreds or thousands of such rows and columns.

In many applications, it is necessary to do image scaling in the Bayer domain. For example, the image sensor resolution for a 13 megapixel digital camera is 3264 pixels by 2448 pixels, and the resolution for a frame of 1080i high definition (HD) video is 1920 pixels by 1080 pixels. A 13 megapixel digital image therefore needs to be scaled down in order to be processed as a frame of 1080i HD video. Transmitting the digital image at full resolution and then scaling the image down at the back end would consume unnecessary amounts of bandwidth and power. Power and bandwidth may be conserved by scaling the digital image by a factor of 2:1 (also referred to as 2:1 binning) prior to transmission. It should be understood that 2:1 image scaling may also be used for other applications, such as reducing the image resolution for printing, storage, etc.

Figure 2A:
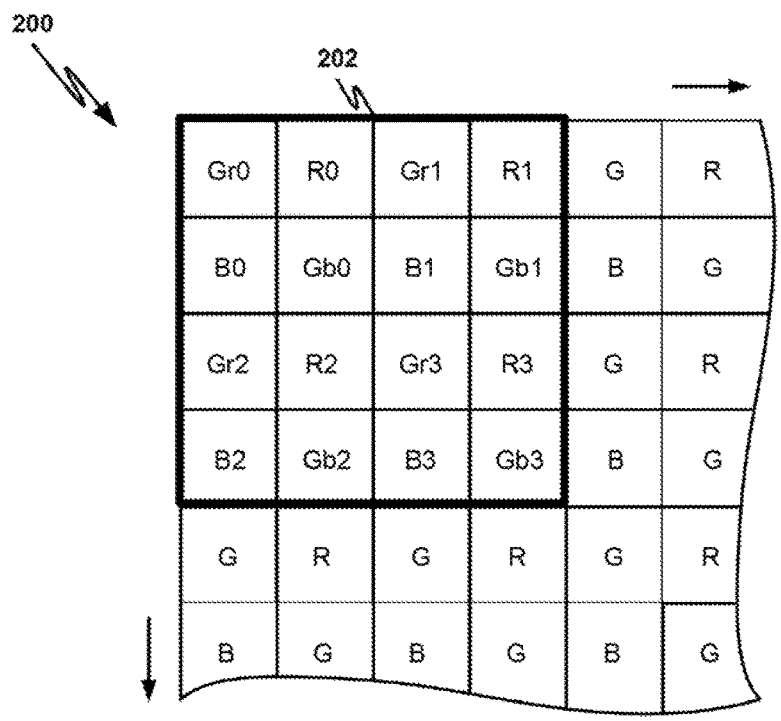
FIGS. 2A and 2B depict an visual representation of 2:1 Bayer image scaling.
Figure 2B:
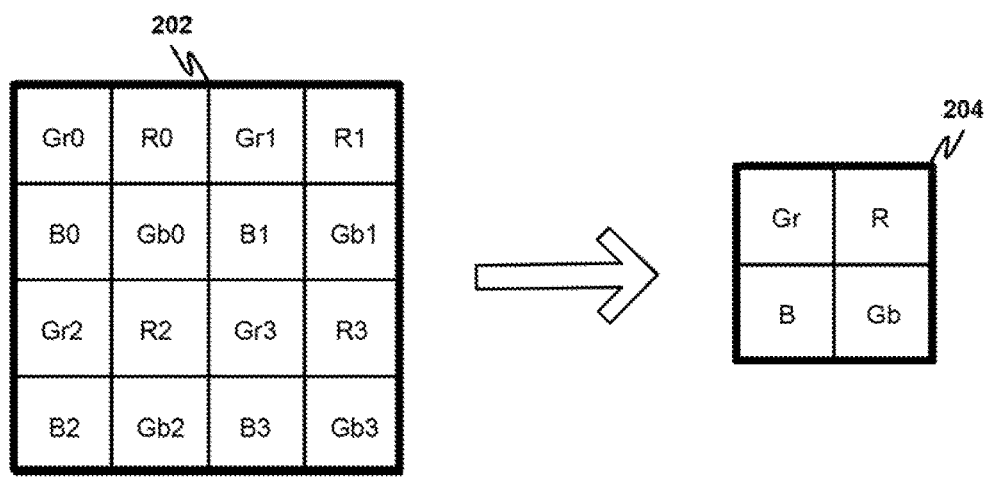

FIGS. 2A and 2B depict an example visual representation of 2:1 Bayer image scaling. As shown in FIG. 2A, a 4×4 group of pixels 202 is selected from the full pixel array 200 for scaling. The selected 4×4 pixel group 202 is scaled by a factor of 2:1 to form a scaled 2×2 Bayer domain image 204, as shown in FIG. 2B. This process is repeated for each 4×4 block of pixels in the fill pixel array 200 (e.g., scaling down a 13 megapixel array of 3264×2448 pixels to an array of 1632×1224 pixels.)

The 4×4 Bayer domain image 202 includes two rows of alternating green and red pixels and two rows of alternating green and blue pixels. Throughout this disclosure and in the figures, green pixels from a row that includes red pixels are referred to as "green-red" pixels or as "Gr" pixels, and green pixels from a row that includes blue pixels are referred to as "green-blue" pixels or as "Gb" pixels. There are several known methods for 2:1 scaling of a Bayer domain image. One popular method takes the average of the four pixels of each type (R, B, Gr, Gb) to generate the four new pixels for the 2×2 array. For example, with reference to FIG. 2B, the 2×2 image would be generated based on the following:

$$Gr=(G0+Gr1+Gr2+Gr3)/4 \qquad \text{Equation No. 1}$$

$$R=(R0+R1+R2+R3)/4 \qquad \text{Equation No. 2}$$

$$B=(B0+B1+B2+B3)/4 \qquad \text{Equation No. 3}$$

$$Gb=(Gb0+Gb1+Gb2+Gb3)/4 \qquad \text{Equation No. 4}$$

where Gr is the green-red pixel in the scaled down image 204, R is the red pixel in the scaled down image 204, B is the blue pixel in the scaled down image 204, Gb is the green-blue pixel in the scaled down image 204, Gr0-Gr3 are the green-red pixels in the input image 202, R0-R3 are the red pixels in the input image 202, B0-B3 are the blue pixels in the input image 202, and Gb0-Gb3 are the green-blue pixels in the input image 202. The scaled down image 204 is determined by processing the input image 202 based on Equation Nos. 1-4. However, the resulting scaled down image 204 based on Equation Nos. 1-4 may visually illustrate soft features with jagged edges.

Another method for 2:1 Bayer image scaling, referred to as simple decimation, selects one of the four pixels from the input image 202 for each pixel type and uses these as the pixels for the scaled down image 204. For example, with reference to FIG. 2B, the scaled down image may be determined by simple decimation based on the following:

$$Gr=Gr0 \qquad \text{Equation No. 5}$$

$$R=R0 \qquad \text{Equation No. 6}$$

$$B=B0 \qquad \text{Equation No. 7}$$

$$Gb=Gb0 \qquad \text{Equation No. 8}$$

Using simple decimation, the scaled down image 204 is determined by processing the input image 204 based on Equation Nos. 5-8. The scaled down image resulting from simple decimation is often sharper than an image scaled using the averaging method. However, simple decimation often causes false color in the resolution chart and jagged edges in the resulting image.

Figure 3:
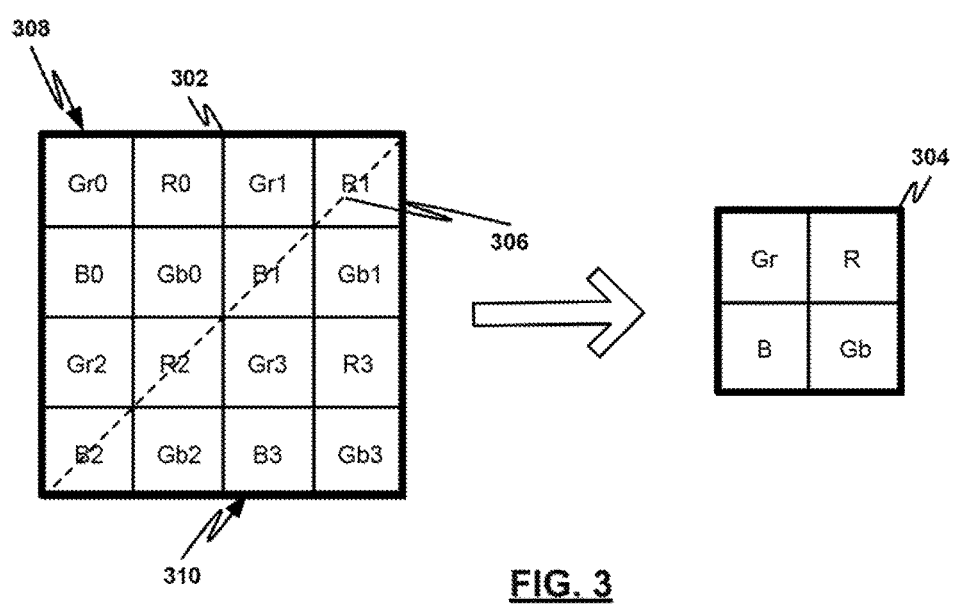
FIG. 3 depicts an example visual representation of a triangular binning method for 2:1 scaling of a Bayer domain image.

FIG. 3 depicts an example visual representation of a triangular binning method for 2:1 scaling of a Bayer domain image. The input to the 2:1 scaling process is a Bayer domain image 302 with a 4 pixel×4 pixel resolution, and the output is a scaled Bayer domain image 304 with a 2 pixel×2 pixel resolution. The input image 302 is divided along a diagonal line 306 that extends between red (R1, R2) and blue (B1, B2) pixels to form two triangular image portions, an upper triangular portion 308 and a lower triangular portion 310. The upper green pixel (Gr) and lower green pixel (Gb) in the scaled down image 304 are then determined by averaging the green pixels within the corresponding upper and lower triangular portions 308, 310. Specifically, in the illustrated example, the green pixels in the scaled down image are determined based on the following:

$$Gr=(Gr0+Gr1+Gr2+Gb0)/4 \qquad \text{Equation No. 9}$$

$$Gb=(Gb1+Gb2+Gb3+Gr3)/4 \qquad \text{Equation No. 10}$$

where Gr is the green-red pixel in the scaled down image 304, Gb is the green-blue pixel in the scaled down image 304, Gr0-Gr3 are the green-red pixels in the input image 302, and Gb0-Gb3 are the green-blue pixels in the input image 302.

The red (R) and blue (B) pixels in the scaled down image 304 may be determined using a median filter to select the median red and blue pixels from the input image 302. In the illustrated example, the red (R) and blue (B) pixels in the scaled down image 304 may be determined as follows:

$$R=\text{Median4}(R0,R1,R2,R3) \qquad \text{Equation No. 11}$$

$$B=\text{Median4}(B0,B1,B2,B3) \qquad \text{Equation No. 12}$$

where R is the red pixel in the scaled down image 304, B is the blue pixel in the scaled down image 304, R0-R3 are the red pixels in the input image 302, and B0-B3 are the blue pixels in the input image 302. The Median4 represents the median filter. The resulting scaled down image 304 is determined by processing the input image 302 based on Equation Nos. 9-12.

It should be appreciated that if the input image 302 were to include an edge substantially along the diagonal line 306, then the triangular binning method would eliminate the interpolation of green pixels across the edge. In addition, the use of a median filter to select the red (R) and blue (B) pixels will prevent outlier pixel shades from contributing to the scaled down image 304. In this way, the triangular binning method may improve sharpness and reduce the presence of jagged edges within the scaled down image 304.

Figure 4:
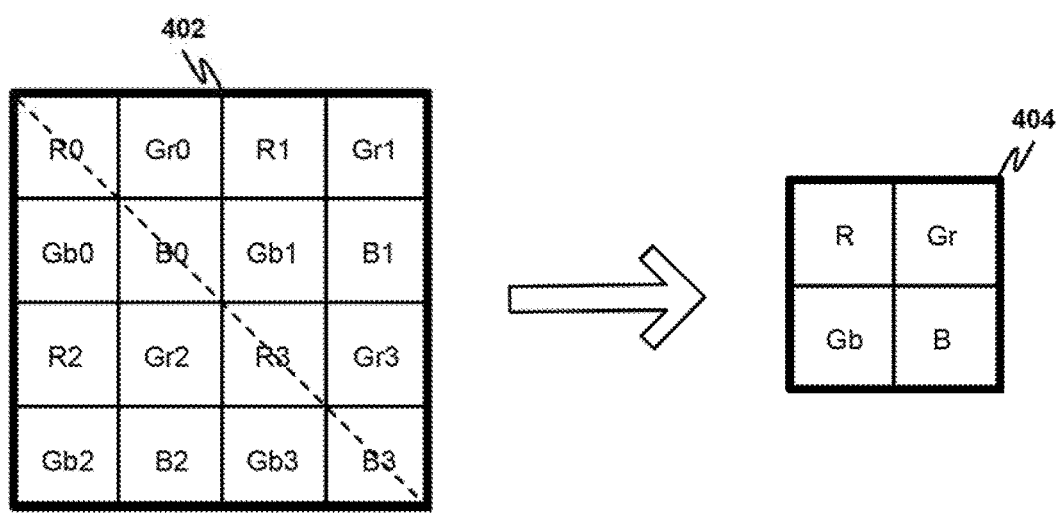
FIG. 4 depicts another example visual representation of the triangular binning method for 2:1 scaling of a Bayer domain image.
Figure 5:
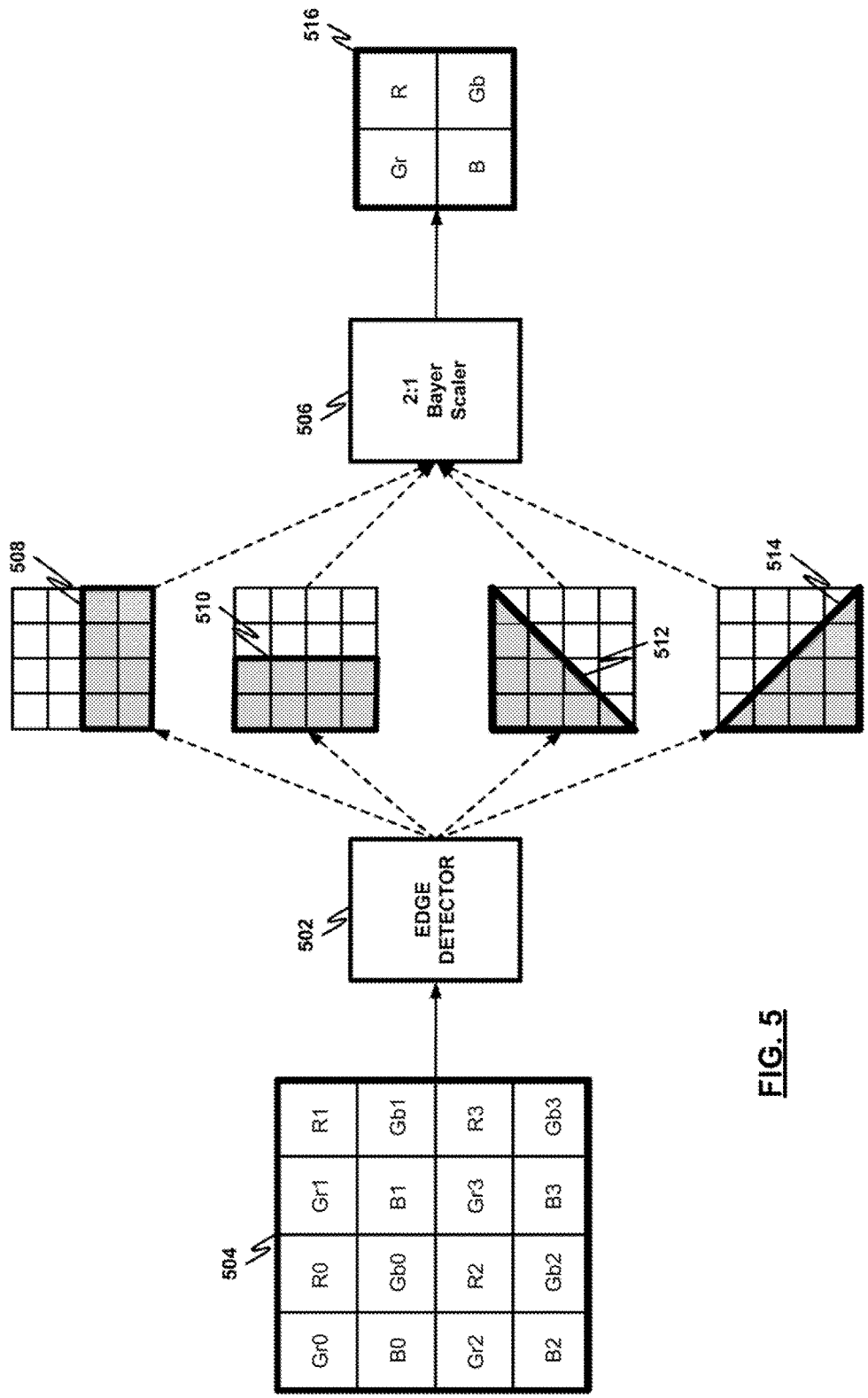
FIGS. 5 and 6A-6D depict an example visual representation of an edge detection method for 2:1 scaling of a Bayer domain image.

FIG. 4 depicts another example visual representation of the triangular binning method for 2:1 scaling of a Bayer domain image. In this example, the input 4×4 Bayer domain image 402 begins with a red pixel (R0) in the upper left corner, instead of a green pixel (Gr0). The triangular binning process used to generate the scaled down image 404 in FIG. 4 is the same as described above with reference to FIG. 3, except that the diagonal line through the red (R0, R3) and blue (B0, B3) pixels as at 1350, instead of 45°. The red, blue and green pixels for the scaled down image 404 are therefore determined based on the following:

$$Gr=(Gr0+Gr1+Gr3+Gb1)/4 \qquad \text{Equation No. 13}$$

$$Gb=(Gb0+Gb2+Gb3+Gr2)/4 \qquad \text{Equation No. 14}$$

$$R=\text{Median4}(R0,R1,R2,R3) \qquad \text{Equation No. 15}$$

$$B=\text{Median4}(B0,B1,B2,B3) \qquad \text{Equation No. 16}$$

where Gr is the green-red pixel in the scaled down image 404, R is the red pixel in the scaled down image 404, B is the blue pixel in the scaled down image 404, Gb is the green-blue pixel in the scaled down image 404, Gr0-Gr3 are the green-red pixels in the input image 402, R0-R3 are the red pixels in the input image 402, B0-B3 are the blue pixels in the input image 402, and Gb0-Gb3 are the green-blue pixels in the input image 402. The Median4 represents the median filter. The resulting scaled down image 404 is determined by processing the input image 402 based on Equation Nos. 13-16.

FIGS. 5 and 6A-D depict an example visual representation of an edge detection method for 2:1 scaling of a Bayer domain image. In this example, an edge detection operation 502 is performed on the input Bayer domain image 504, and the 2:1 scaling operation 506 is optimized based on the detected edge to generate the scaled down image 516. In one example, the detected edge may correspond to one of edges 508, 510, 512 or 514. More specifically, the scaled down image 516 may bes produced by applying a scaling operation to the input image 504, where the scaling operation is selected based on an orientation of the detected edge. The edge detector 502 may utilize a known edge detection operation, such as a gradient-based or Canny edge detector, to identify an edge within the input image 504. A detected edge may, for example, be a sharp change in the image brightness and/or color caused by a change in the properties of the object or scene (e.g., the edge of an object, a change in depth, a variation in scene illumination, etc.)

In addition to detecting the presence of an edge in the image, the edge detector 502 also identifies the orientation of the edge with respect to the array of pixels in the input image 504. In an embodiment, the edge detector 502 categorizes a detected edge as either a horizontal (i.e., 00) edge 508, a vertical (i.e., 90°) edge 510, a 45° diagonal edge 512, or a 135° diagonal edge 514. It should be understood, however, that in other embodiments edges may be detected and categorized at angles other than or in addition to 0°, 45°, 90° and 135°. The orientation of the detected edge (508, 510, 512 or 514) is used by the 2:1 Bayer scaler 506 to select one of multiple available scaling methods that best preserves the sharpness of the edge, as illustrated in FIGS. 6A-6D.

Figure 6A:
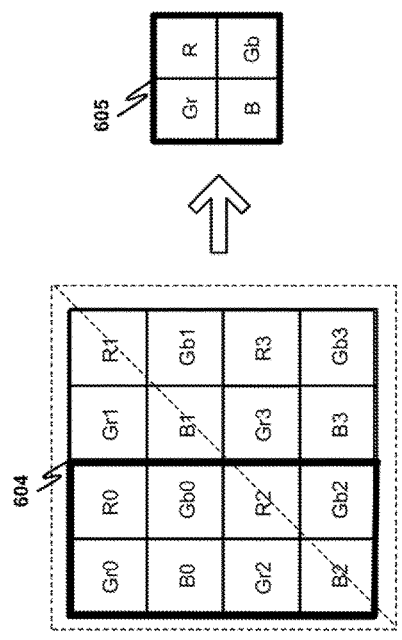
Figure 6B:
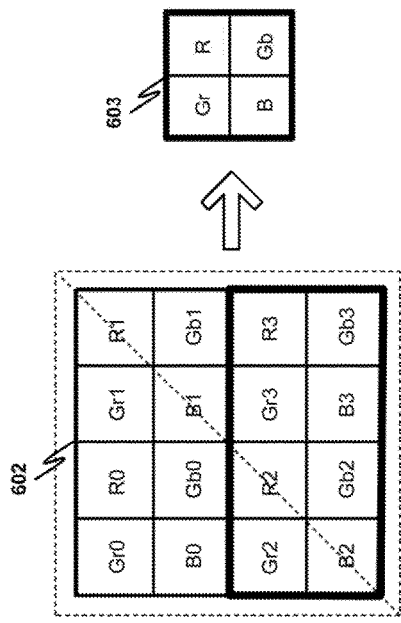
Figure 6C:
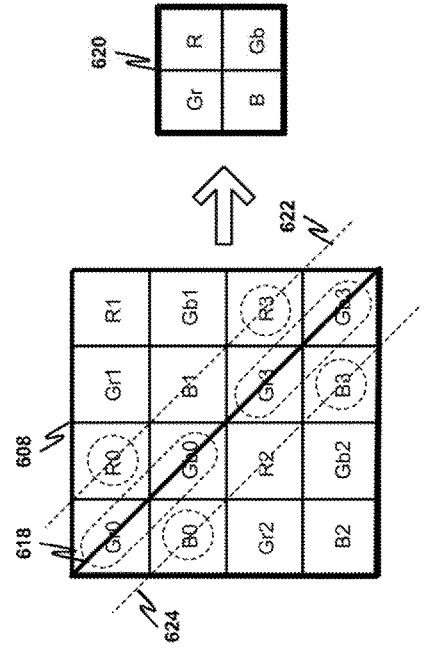
Figure 6D:
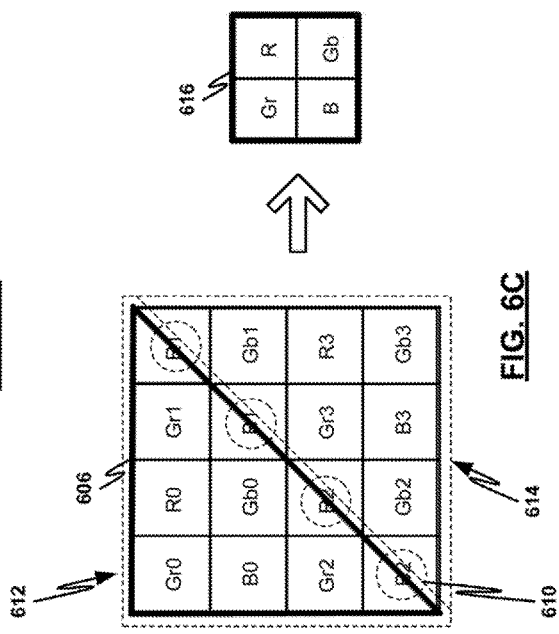

FIGS. 6A-6D illustrate example visual representations of methods for 2:1 scaling of a Bayer domain image based on the orientation of a detected edge within the image. FIG. 6A depicts an example 4×4 Bayer domain image 602 with a detected horizontal edge. FIG. 6B depicts an example 4×4 Bayer domain image 604 with a detected vertical edge. FIG. 6C depicts an example 4×4 Bayer domain image 606 with a detected 45° diagonal edge. FIG. 6D depicts an example 4×4 Bayer domain image 608 with a detected 135° diagonal edge.

With reference first to FIGS. 6A and 6B, if the edge detector detects either a horizontal edge or a vertical edge within the input image 602, 604, then a triangular binning method may be used for 2:1 scaling, as described above with reference to FIGS. 3 and 4. For example, in the embodiment illustrated in FIGS. 6A and 6B, the input images 602, 604 may be processed to produce scaled down images 603, 605, as follows:

$$Gr=(Gr0+Gr1+Gr2+Gb0)/4 \quad \text{Equation No. 17}$$

$$Gb=(Gb1+Gb2+Gb3+Gr3)/4 \quad \text{Equation No. 18}$$

$$R=\text{Median4}(R0,R1,R2,R3) \quad \text{Equation No. 19}$$

$$B=\text{Median4}(B0,B1,B2,B3) \quad \text{Equation No. 20}$$

where Gr is the green-red pixel in the scaled down image 603 or 605, R is the red pixel in the scaled down image 603 or 605, B is the blue pixel in the scaled down image 603 or 605, Gb is the green-blue pixel in the scaled down image 603 or 605, Gr0-Gr3 are the green-red pixels in the input image 602 or 604, R0-R3 are the red pixels in the input image 602 or 604, B0-B3 are the blue pixels in the input image 602 or 604, and Gb0-Gb3 are the green-blue pixels in the input image 602 or 604. The resulting scaled down image 603 or 605 is determined by processing the respective input image 602 or 604 based on Equation Nos. 17-20. The Median operations (i.e., Median4(R0, R1, R2, R3) and Median4(B0, B1, B2, B3)) in Equation Nos. 19 and 20 may be performed using a median filter to select the median red and blue pixels from the input image 602 or 604, as described above with reference to FIG. 3.

In an embodiment, the triangular method described above with reference to FIGS. 6A and 6B may be used if the detected edge has a value equal to or higher than 0 degrees and lower than 45 degrees or higher than 45 degrees and equal to or lower than 90 degrees. In another embodiment, the triangular binning method described above with reference to FIGS. 6A and 6B may also be used as a default if the edge detector does not detect any edge within the input image.

With reference now to FIG. 6C, if the detected edge is oriented along a diagonal line that extends between red and blue pixels of the 4×4 Bayer domain image (i.e., in the same diagonal direction used for the triangular binning), then a modified triangular binning method may be utilized for 2:1 scaling. Using the modified triangular binning method illustrated in FIG. 6C, the green pixels are grouped using triangular binning. Specifically, the input image 606 is divided along a diagonal line 610 that extends across red (R1, R2) and blue (B1, B2) pixels to form two triangular image portions, an upper triangular portion 612 and a lower triangular portion 614. The upper green pixel (Gr) and lower green pixel (Gb) in the scaled down image 616 are then generated by averaging the green pixels within the corresponding upper and lower triangular portions 612, 614. More specifically, the upper green pixel (Gr) in the scaled down image 616 is determined by averaging the green pixels (Gr0, Gr1, Gr2, Gb0) within the upper triangular portion 612, and the lower green pixel (Gb) in the scaled down image 616 is determined by averaging the green pixels (Gb1, Gb2, Gb3, Gr3) within the lower triangular portion 614. In the illustrated example, the green pixels in the scaled down image 616 are determined based on the following:

$$Gr=(Gr0+Gr1+Gr2+Gb0)/4 \quad \text{Equation No. 21}$$

$$Gb=(Gb1+Gb2+Gb3+Gr3)/4 \quad \text{Equation No. 22}$$

where Gr is the green-red pixel in the scaled down image 616, Gb is the green-blue pixel in the scaled down image 616, Gr0-Gr3 are the green-red pixels in the input image 606, and Gb0-Gb3 are the green-blue pixels in the input image 606.

The red (R) and blue (B) pixels in the scaled down image 616 are determined by averaging the red (R1, R2) and blue (B1, B2) pixels that are located along the diagonal line 610 in the input image 606. In the illustrated example, the red (R) and blue (B) pixels in the scaled down image 616 are determined based on the following:

$$R=(R1+R2)/2 \quad \text{Equation No. 23}$$

$$B=(B1+B2)/2 \quad \text{Equation No. 24}$$

where R is the red pixel in the scaled down image 616, B is the blue pixel in the scaled down image 616, R1 and R2 are red pixels in the input image 606, and B1 and B2 are blue pixels in the input image 606. The resulting scaled down image 616 is determined by processing the input image 606 based on Equation Nos. 21-24.

With reference now to FIG. 6D, if the detected edge is oriented along a diagonal line that extends between green pixels of the 4×4 Bayer domain image (i.e., perpendicular to the diagonal direction used for the triangular binning), then a triangular binning method is not utilized for scaling. Instead, the image sharpness may be better preserved by averaging the red, blue and green pixels aligned along the edge 618 to generate the scaled down image 620. Specifically, the two upper-most green pixels (Gr0, Gb0) along the edge 618 may be averaged to generate the upper green pixel (Gr) in the scaled down image 620, and the two lower-most green pixels (Gr3, Gb3) along the edge 618 may be averaged to generate the lower green pixel (Gb) in the scaled down image 620. The red (R) pixel for the scaled down image 620 may be determined by averaging the two red pixels (R0, R3) that are diagonally aligned 622 parallel to the edge 618 in the input image 608. Similarly, the blue (B) pixel for the scaled down image 620 may be determined by averaging the two blue pixels (B0, B3) that are diagonally aligned 624 parallel to the edge 618 in the input image 618. In the illustrated example, the pixels for the scaled down image 620 are determined based on the following:

$$Gr=(Gr0+Gb0)/2 \quad \text{Equation No. 25}$$

$$R=(R0+R3)/2 \quad \text{Equation No. 26}$$

$$B=(B0+B3)/2 \quad \text{Equation No. 27}$$

$$Gb=(Gr3+Gb3)/2 \quad \text{Equation No. 28}$$

where Gr is the green-red pixel in the scaled down image 620, R is the red pixel in the scaled down image 620, B is the blue pixel in the scaled down image 620, Gb is the green-blue pixel in the scaled down image 620, Gr0 and Gr3 are the green-red pixels in the input image 608, R0 and R3 are the red pixels in the input image 608, B0 and B3 are the blue pixels in the input image 608, and Gb0 and Gb3 are the green-blue pixels in the input image 608. The resulting scaled down image 620 is determined by processing the input image 608 based on Equation Nos. 25-28.

Figure 7:
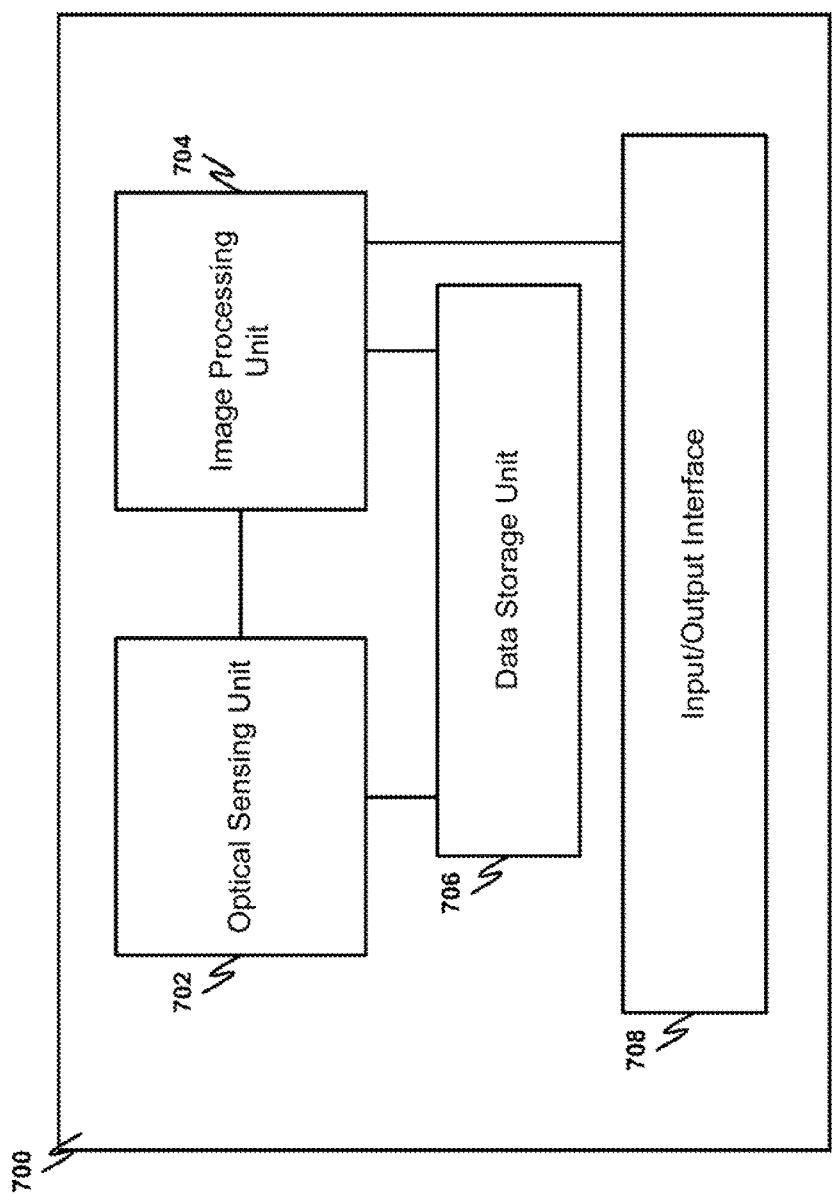
FIG. 7 is a block diagram of an example imaging device.

FIG. 7 is a block diagram of an example imaging device 700 that includes an image processing unit 704 configured to perform edge detection and 2:1 Bayer domain image scaling operations in an image captured by a pixel array. Embodiments of the example imaging device shown in FIG. 7 are included in stand-alone digital cameras and in digital cameras embedded in other electronic devices, such as cellular phones, laptop computers, and hand-held personal computing devices. As shown in FIG. 7, example imaging device 700 includes an optical sensing unit 702, the image processing unit 704, a data storage unit 706, and an input/output interface 708. In other examples, the example imaging device 700 further includes memory (e.g., as part of the data storage unit 706, the input/output interface 708, or as a standalone component) and a bus that connects one or more of the components 702, 704, 706, 708.

The components of the imaging device 700 are configured to provide 2:1 Bayer domain image scaling as described herein. The optical sensing unit 702 includes a pixel array or other components used to form a complementary metal-oxide-semiconductor (CMOS) image sensor or charge-coupled device (CCD) image sensor. In providing the edge detection and 2:1 Bayer domain image scaling, the image processing unit 704 includes one or more processors for processing image pixel output signals that are generated by the optical sensing unit 702.

The data storage unit 706 and memory are configured to hold persistent and non-persistent copies of computer code and data. The computer code includes instructions that when accessed by the image processing unit 704 result in the imaging device 700 performing 2:1 Bayer domain image scaling as described above. The data includes data to be acted upon by the instructions of the code, and in an example, the data includes stored pixel output signals. The processing unit 704 includes one or more single-core processors, multiple-core processors, controllers, or application-specific integrated circuits (ASICs), among other types of processing components. The memory includes random access memory (RAM), dynamic RAM (DRAM), static RAM (SRAM), synchronous DRAM (SDRAM), or dual-data rate RAM (DDRRAM), among other types of memory.

The data storage unit 706 includes integrated or peripheral storage devices, such as, but not limited to, disks and associated drives (e.g., magnetic, optical), USB storage devices and associated ports, flash memory, read-only memory (ROM), or non-volatile semiconductor devices, among others. In an example, data storage unit 706 is a storage resource physically part of the imaging device 700, and in another example, the data storage unit 706 is accessible by, but not a part of, the imaging device 700. The input/output interface 708 includes interfaces designed to communicate with peripheral hardware (e.g., remote optical imaging sensors or other remote devices). In various embodiments, imaging device 700 has more or less elements or a different architecture.

Figure 8:
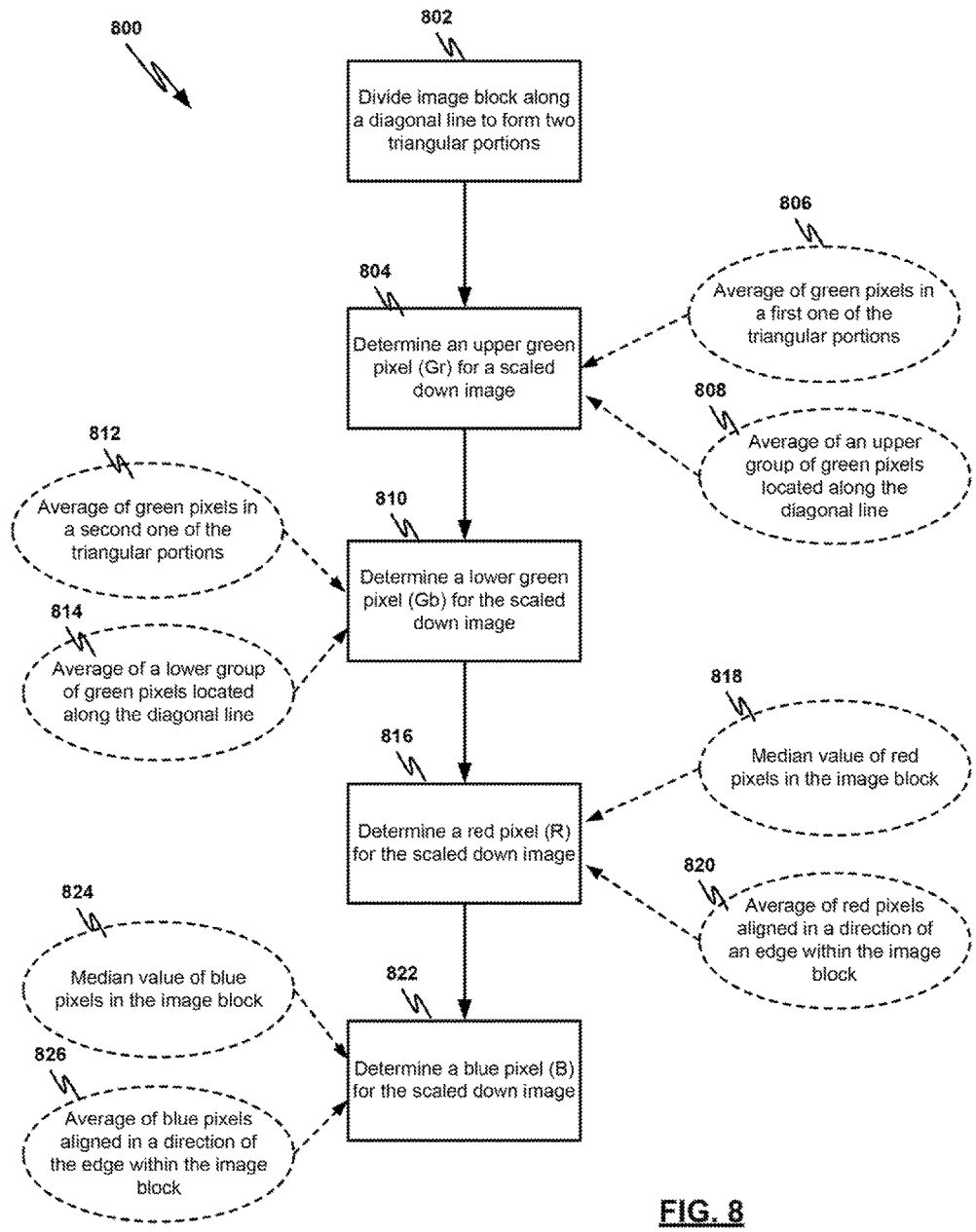
FIG. 8 is a flow diagram of an example method for processing an image represented in a Bayer domain.

FIG. 8 is a flow diagram of an example method 800 of processing an image represented in a Bayer domain. At 802, a block of the image is divided along a diagonal line to form two triangular portions of the block of the image. At 804, an upper green pixel for a scaled down image is determined based on either (i) an average 806 of green pixels in a first one of the two triangular portions or (ii) an average 808 of an upper group of green pixels located along the diagonal line. At 810, lower green pixel for the scaled down image is determined based on either (i) an average 812 of green pixels in a second one of the two triangular portions or (ii) an average 814 of a lower group of green pixels located along the diagonal line. At 816, a red pixel for the scaled down image is determined based on either (i) a median value 818 of red pixels in the block of the image or (ii) an average 820 of red pixels that are aligned in a direction of an edge within the block of the image. At 822, a blue pixel for the scaled down image is determined based on either (i) a median value 824 of blue pixels in the block of the image or (ii) an average 826 of blue pixels that are aligned in the direction of the edge. The determinations in FIG. 8 may be performed in accordance with the principles described in connection with Equation Nos. 1-28.

This application uses examples to illustrate the invention. The patentable scope of the invention may include other examples.

What is claimed is:

1. A processor implemented method of processing an image represented in a Bayer domain, comprising:
    dividing a block of the image along a diagonal line to form two triangular portions of the block of the image;
    detecting an edge within the block of the image; and
    based on a determination that either (a) the detected edge has a value equal to or higher than 0 degrees and lower than 45 degrees, (b) the detected edge has a value higher than 45 degrees and equal to or lower than 90 degrees, or (c) no edge exists within the block of the image, determining an upper green pixel for a scaled down image based on an average of green pixels in a first one of the two triangular portions, determining a lower green pixel for the scaled down image based on an average of green pixels in a second one of the two triangular portions, determining a red pixel for the scaled down image based on a median value of red pixels in the block of the image, and determining a blue pixel for the scaled down image based on a median value of blue pixels in the block of the image.

2. The method of claim 1, wherein pixel values for the scaled down image are determined based on, $$Gr=(Gr0+Gr1+Gr2+Gb0)/4,$$

$$Gb=(Gb1+Gb2+Gb3+Gr3)/4,$$

$$R=\text{Median4}(R0,R1,R2,R3),$$

$$B=\text{Median4}(B0,B1,B2,B3),$$

where Gr is a green-red pixel and the upper green pixel in the scaled down image, Gb is a green-blue pixel and the lower green pixel in the scaled down image, R is the red pixel in the scaled down image, B is the blue pixel in the scaled down image, Gr0-Gr3 are green-red pixels and a subset of the green pixels in the block of the image, Gb0-Gb3 are green-blue pixels and another subset of the green pixels in the block of the image, R0-R3 are red pixels in the block of the image, and B0-B3 are blue pixels in the block of the image.

3. A processor implemented method of processing an image represented in a Bayer domain, comprising:

dividing a block of the image along a diagonal line to form two triangular portions of the block of the image; and detecting an edge within the block of the image, based on a determination that the detected edge has a value equal to 45 degrees, determining an upper green pixel for a scaled down image based on an average of green pixels in a first one of the two triangular portions, determining a lower green pixel for the scaled down image based on an average of green pixels in a second one of the two triangular portions, determining a red pixel for the scaled down image based an average of red pixels that are aligned along the edge, and determining a blue pixel for the scaled down image based an average of blue pixels that are aligned along the edge.

4. The method of claim 3, wherein pixel values for the scaled down image are determined based on, $$Gr=(Gr0+Gr1+Gr2+Gb0)/4,$$

$$Gb=(Gb1+Gb2+Gb3+Gr3)/4,$$

$$R=(R1+R2)/2,$$

$$B=(B1+B2)/2,$$

where Gr is a green-red pixel and the upper green pixel in the scaled down image, Gb is a green-blue pixel and the lower green pixel in the scaled down image, R is the red pixel in the scaled down image, B is the blue pixel in the scaled down image, Gr0-Gr3 are green-red pixels and a subset of the green pixels in the block of the image, Gb0-Gb3 are green-blue pixels and another subset of the green pixels in the block of the image, R0-R3 are red pixels in the block of the image, and B0-B3 are blue pixels in the block of the image.

5. An imaging device, comprising:

an image processing unit configured to receive an image represented in a Bayer domain, and execute instructions stored on a processor-readable medium to divide a block of the image along a diagonal line to form two triangular portions of the block of the image, detect an edge within the block of the image, based on a determination that either (a) the detected edge has a value equal to or higher than 0 degrees and lower than 45 degrees, (b) the detected edge has a value higher than 45 degrees and equal to or lower than 90 degrees, or (c) no edge exists within the block of the image, determine an upper green pixel for a scaled down image based on an average of green pixels in a first one of the two triangular portions, determine a lower green pixel for the scaled down image based on an average of green pixels in a second one of the two triangular portions, determine a red pixel for the scaled down image based on a median value of red pixels in the block of the image, and determine a blue pixel for the scaled down image based on a median value of blue pixels in the block of the image, based on a determination that the detected edge has a value equal to 45 degrees, determine the upper green pixel for the scaled down image based on the average of green pixels in the first one of the two triangular portions, determine the lower green pixel for the scaled down image based on the average of green pixels in the second one of the two triangular portions, determine the red pixel for the scaled down image based on an average of red pixels that are aligned along the edge, and determine the blue pixels for the scaled down image based on an average of blue pixels that are aligned along the edge.

6. The imaging device of claim 5, wherein based on a determination that either (a) the detected edge has a value equal to or higher than 0 degrees and lower than 45 degree, (b) the detected edge has a value higher than 45 degrees and equal to or lower than 90 degrees, or (c) no edge exists within the block of the image, pixel values for the scaled down image are determined based on, $$Gr=(Gr0+Gr1+Gr2+Gb0)/4,$$

$$Gb=(Gb1+Gb2+Gb3+Gr3)/4,$$

$$R=\text{Median4}(R0,R1,R2,R3),$$

$$B=\text{Median4}(B0,B1,B2,B3),$$

where Gr is a green-red pixel and the upper green pixel in the scaled down image, Gb is a green-blue pixel and the lower green pixel in the scaled down image, R is the red pixel in the scaled down image, B is the blue pixel in the scaled down image, Gr0-Gr3 are green-red pixels and a subset of the green pixels in the block of the image, Gb0-Gb3 are green-blue pixels and another subset of the green pixels in the block of the image, R0-R3 are red pixels in the block of the image, and B0-B3 are blue pixels in the block of the image.

7. The imaging device of claim 5, wherein based on a determination that the detected edge has a value equal to 45 degrees, pixel values for the scaled down image are determined based on, $Gr=(Gr0+Gr1+Gr2+Gb0)/4,$ $Gb(Gb1+Gb2+Gb3+Gr3)/4,$ $R=(R1+R2)/2,$ $B=(B1+B2)/2,$ where Gr is a green-red pixel and the upper green pixel in the scaled down image, Gb is a green-blue pixel and the lower green pixel in the scaled down image, R is the red pixel in the scaled down image, B is the blue pixel in the scaled down image, Gr0-Gr3 are green-red pixels and a subset of the green pixels in the block of the image, Gb0-Gb3 are green-blue pixels and a subset of the green pixels in the block of the image, R0-R3 are red pixels in the block of the image, and B0-B3 are blue pixels in the block of the image.

* * * * *